(12) United States Patent
Mimeault et al.

(10) Patent No.: US 11,415,451 B2
(45) Date of Patent: Aug. 16, 2022

(54) HIGH AND/OR LOW ENERGY SYSTEM COUPLER

(71) Applicant: ABB Schweiz AG, Baden (CH)

(72) Inventors: Yvan Mimeault, Quebec (CA); Patrick Couture, Quebec (CA); Simon Lamarre, Quebec (CA)

(73) Assignee: ABB Schweiz AG, Baden (CH)

( * ) Notice: Subject to any disclaimer, the term of this patent is extended or adjusted under 35 U.S.C. 154(b) by 761 days.

(21) Appl. No.: 16/371,119

(22) Filed: Apr. 1, 2019

(65) Prior Publication Data

US 2020/0309586 A1 Oct. 1, 2020

(51) Int. Cl.
*G01F 23/284* (2006.01)
*H01P 5/12* (2006.01)

(52) U.S. Cl.
CPC .............. *G01F 23/284* (2013.01); *H01P 5/12* (2013.01)

(58) Field of Classification Search
CPC ..................................................... G01F 23/284
See application file for complete search history.

(56) References Cited

U.S. PATENT DOCUMENTS

| | | | |
|---|---|---|---|
| 5,723,979 A * | 3/1998 | Mohr | G01R 27/2658 324/634 |
| 5,851,083 A * | 12/1998 | Palan | G01F 23/284 403/337 |
| 5,877,663 A * | 3/1999 | Palan | H01Q 19/08 333/252 |
| 5,884,231 A | 3/1999 | Perdue et al. | |
| 5,943,908 A * | 8/1999 | Innes | G01F 23/284 73/304 C |
| 5,955,684 A * | 9/1999 | Gravel | H01R 13/527 73/866.5 |
| 5,969,666 A | 10/1999 | Burger et al. | |
| 5,973,637 A | 10/1999 | Perdue et al. | |

(Continued)

FOREIGN PATENT DOCUMENTS

| | | |
|---|---|---|
| EP | 2071302 A2 | 6/2009 |
| EP | 2327966 A1 | 11/2009 |

OTHER PUBLICATIONS

D.A. Linkens et al., "Expert Control Systems—I Concepts, Characteristics and Issues," Engineering Applications of Artificial Intelligence, vol. 8, No. 4, Aug. 1, 1995, pp. 413-421.

(Continued)

*Primary Examiner* — Peter M Bythrow
(74) *Attorney, Agent, or Firm* — Armstrong Teasdale LLP

(57) ABSTRACT

Devices, systems, and methods for interacting instrumentation with high and/or low energy systems are disclosed. In some illustrative embodiments, a sensor assembly for level measurement of high and/or low energy systems may comprise an instrumentation head to determine a level of media in a tank; a coupler including a body having a mounting end for connection to equipment of a high or low energy system and a receiving end for receiving connection of the instrumentation head, a coaxial hardline extending between the mounting and receiving ends and including a conduction tip arranged near the mounting end; and a sealing system including a first seal section disposed between the conduction tip and the receiving end of the body.

19 Claims, 4 Drawing Sheets

(56) References Cited

U.S. PATENT DOCUMENTS

| | | | |
|---|---|---|---|
| 6,062,095 A * | 5/2000 | Mulrooney | G01D 11/24 73/204.22 |
| 6,078,280 A | 6/2000 | Perdue et al. | |
| 6,087,978 A | 7/2000 | Laila et al. | |
| 6,118,282 A * | 9/2000 | Grieger | G01F 23/284 73/866.5 |
| 6,148,681 A * | 11/2000 | Gravel | H01R 13/527 73/866.5 |
| 6,178,817 B1 * | 1/2001 | Hewelt | G01F 25/24 73/304 R |
| 6,247,362 B1 * | 6/2001 | Soroka | G01F 23/284 73/866.5 |
| 6,295,018 B1 | 9/2001 | Diede et al. | |
| 6,373,428 B1 | 4/2002 | McEwan | |
| 6,559,657 B1 | 5/2003 | McCarthy et al. | |
| 6,679,115 B2 | 1/2004 | Heidecke | |
| 7,249,504 B1 * | 7/2007 | Wendler | G01F 23/284 73/866.5 |
| 7,255,002 B2 | 8/2007 | Gravel et al. | |
| 7,283,096 B2 * | 10/2007 | Geisheimer | H01Q 1/40 343/789 |
| 7,284,425 B2 | 10/2007 | Wennerberg et al. | |
| 7,334,451 B1 | 2/2008 | Fauveau | |
| 7,412,337 B2 | 8/2008 | Michalski et al. | |
| 7,420,877 B2 | 9/2008 | Hosseini et al. | |
| 7,710,125 B2 | 5/2010 | Schultheiss et al. | |
| 8,022,862 B2 | 9/2011 | Larocque et al. | |
| 8,044,844 B2 | 10/2011 | Nyberg | |
| 8,639,457 B2 | 1/2014 | Hammer et al. | |
| 8,844,352 B2 | 9/2014 | Nilsson et al. | |
| 8,963,768 B2 * | 2/2015 | Kienzle | G01F 23/284 73/866.5 |
| 8,963,769 B2 * | 2/2015 | Linden | G01F 23/284 342/21 |
| 9,593,976 B2 | 3/2017 | Nilsson et al. | |
| 9,810,568 B2 * | 11/2017 | Heath | G01S 7/28 |
| 2002/0053238 A1 * | 5/2002 | Fahrenbach | G01F 23/284 73/290 R |
| 2002/0109626 A1 | 8/2002 | Spanke | |
| 2003/0201842 A1 * | 10/2003 | Gard | G01F 23/268 333/24 R |
| 2005/0150568 A1 * | 7/2005 | Dietmeier | H01R 13/5202 141/95 |
| 2005/0168379 A1 | 8/2005 | Griessbaum et al. | |
| 2005/0253751 A1 * | 11/2005 | Feisst | G01F 23/284 342/124 |
| 2005/0264302 A1 * | 12/2005 | Mohajer | G01N 22/00 324/639 |
| 2006/0005621 A1 * | 1/2006 | Lenk | G01F 23/284 73/290 V |
| 2006/0225499 A1 * | 10/2006 | Gravel | G01F 23/284 73/290 V |
| 2006/0274871 A1 | 12/2006 | Griessbaum | |
| 2007/0084281 A1 * | 4/2007 | Fredriksson | G01F 23/284 73/290 R |
| 2007/0205781 A1 * | 9/2007 | Eriksson | H01R 24/50 342/124 |
| 2008/0134778 A1 * | 6/2008 | Osswald | G01F 23/284 73/304 C |
| 2009/0146867 A1 * | 6/2009 | Delin | G01F 25/20 342/124 |
| 2009/0229359 A1 * | 9/2009 | Reimelt | G01F 23/284 73/304 R |
| 2009/0284887 A1 * | 11/2009 | Kauffman | H01P 1/045 361/111 |
| 2010/0126288 A1 * | 5/2010 | Osswald | G01F 23/00 73/866.5 |
| 2011/0005312 A1 * | 1/2011 | Hopper | G01F 23/40 73/313 |
| 2012/0186339 A1 * | 7/2012 | Feisst | H01Q 1/002 73/290 V |
| 2012/0265486 A1 | 10/2012 | Klofer et al. | |
| 2013/0127654 A1 * | 5/2013 | Kienzle | G01F 23/284 285/123.3 |
| 2013/0314275 A1 * | 11/2013 | Fredriksson | G01F 23/284 342/124 |
| 2014/0103950 A1 * | 4/2014 | Janitch | G01F 23/284 324/755.02 |
| 2014/0109699 A1 * | 4/2014 | Janitch | G01D 11/30 73/866.5 |
| 2014/0113486 A1 * | 4/2014 | Wild | H01R 4/183 439/578 |
| 2014/0266864 A1 * | 9/2014 | Fredriksson | G01S 13/88 342/124 |
| 2015/0168201 A1 * | 6/2015 | Cobianu | G01S 7/03 342/124 |
| 2015/0276460 A1 * | 10/2015 | Georgescu | G01F 23/284 342/124 |
| 2015/0332809 A1 * | 11/2015 | Natoli | H01R 4/029 29/860 |
| 2015/0362354 A1 * | 12/2015 | Schultheiss | G01F 23/284 342/124 |
| 2016/0153820 A1 * | 6/2016 | Heath | H01Q 13/08 342/124 |
| 2016/0187179 A1 * | 6/2016 | Hrncir | G01F 23/26 73/304 C |
| 2018/0306631 A1 * | 10/2018 | Janitch | G01F 23/284 |
| 2018/0364075 A1 * | 12/2018 | Bitto | G01F 15/14 |
| 2020/0217706 A1 * | 7/2020 | Wildey | G01S 13/00 |

OTHER PUBLICATIONS

European Patent Office, International Search Report and Written Opinion for related PCT/EP2020/059270, dated Jul. 2, 2020, 13 pages.

European Patent Office, International Search Report and Written Opinion for related PCT/EP2020/059263, dated Jul. 8, 2020, 15 pages.

European Patent Office, International Search Report and Written Opinion for related PCT/EP2020/059257, dated Jun. 29, 2020, 15 pages.

* cited by examiner

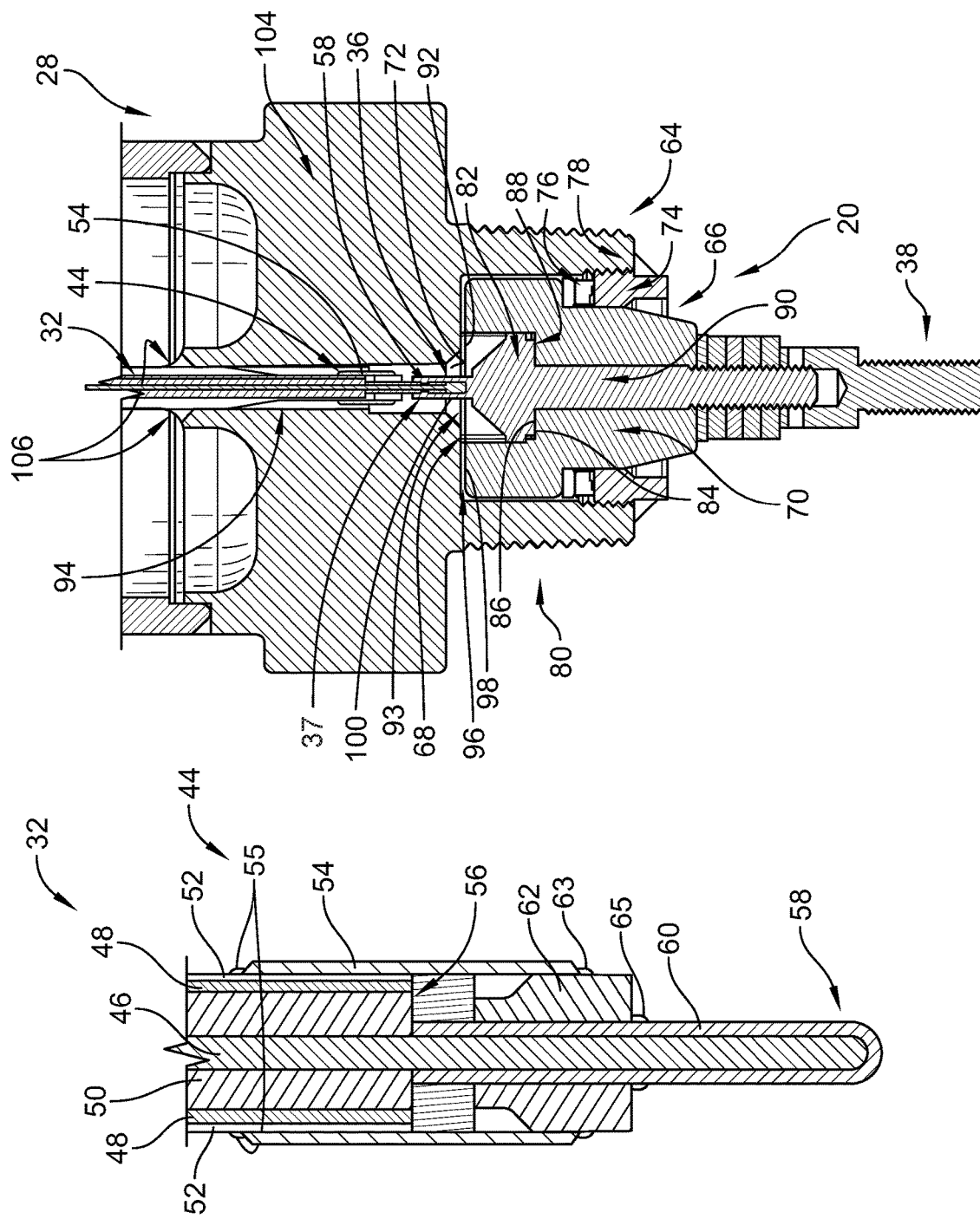

HIGH AND/OR LOW ENERGY SYSTEM COUPLER

TECHNICAL FIELD

The present disclosure relates to the field of process instrumentation. More particularly, the present disclosure relates to process instrumentation for high or low energy systems.

BACKGROUND

Interaction of instrumentation with particularly high or low energy systems, for example, systems of particularly high or low temperature or pressure, can present challenges. The particularly high or low energy of the systems can require isolation of the process conditions while maintaining accurate and/or reliable interaction with instrumentation. Yet, protections against process conditions can inhibit accurate and/or reliable interaction.

SUMMARY

According to an aspect of the present disclosure, a sensor assembly for level measurement of high and/or low energy systems may comprise an instrumentation head to determine a level of media in a tank, a coupler including a body having a mounting end for connection to equipment of a high or low energy system and a receiving end for receiving connection of the instrumentation head, with a coaxial hardline extending between the mounting and receiving ends and including a conduction tip arranged near the mounting end, and a sealing system including a first seal section disposed between the conduction tip and the receiving end of the body.

In some embodiments, the first seal section may include a fused seam between a sleeve of the coaxial hardline and the body of the coupler. The first seal section may include a fused seam between a sleeve of the coaxial hardline and an extension tube of the conduction tip.

In some embodiments, the body may include a mount receiver at the mounting end formed to receive a bushing assembly to engage a connector with the conduction tip. A gasket may be disposed between the bushing assembly and the body and may form at least a portion of a second seal section of the sealing system. Another gasket may be disposed between the bushing assembly and the connector and may form at least another portion of the second seal section.

In some embodiments, the mount receiver may define a receptacle for receiving at least a portion of the bushing assembly, and the receptacle may include interior threads for receiving a fastener of the bushing assembly. The connector may penetrate through the bushing assembly, and the bushing assembly may fill the receptacle to reduce empty space at the mounting end. The connector may engage the conduction tip when the bushing assembly is installed from the mounting end of the coupler.

In some embodiments, the coaxial hardline may include an inner conductor, an outer conductor, and an insulator between the inner and outer conductors. The insulator may comprise at least one of MgO, $Al_2O_3$, and $SiO_2$.

In some embodiments, the bushing assembly may include a ceramic bushing defining a cavity therein for receiving a head of the connector. A gasket forming at least a portion of the second seal section of the sealing system may be disposed between the head and the bushing, with the head positioned between the gasket and the conduction tip.

In some embodiments, the mount receiver may include an endwall surface defining a base of the receptacle having an opening communicating with a passageway containing the coaxial hardline. The conduction tip may terminate within the passageway. In some such embodiments, the coaxial hardline does not extend through the endwall surface.

In some embodiments, the mount receiver may be formed as an extension from a base portion of the body. The base portion may have a solid core for providing structural support to the assembly. The solid core may have a through passageway into which the coaxial hardline extends. The first seal section may include a fused seam formed between the mount receiver and a sleeve of the coaxial hardline to seal the passageway against leakage.

In some embodiments, the body may define a cavity through which the coaxial hardline extends. The cavity may be filled with an insulation material. Illustratively, the coaxial hardline may be a 50 ohm impedance hardline. The connector may engage the conduction tip when the bushing assembly is installed from the mounting end of the coupler.

In some embodiments, the sealing system may include a second seal section disposed between the conduction tip and the mounting end of the body of the coupler. The second seal section may include at least one gasket.

These and other features of the present disclosure will become more apparent from the following description of the illustrative embodiments.

BRIEF DESCRIPTION OF THE DRAWINGS

The concepts described in the present disclosure are illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. The detailed description particularly refers to the accompanying figures in which:

FIG. 5 is closer view of the conduction tip of the communication line of FIG. 4 showing that the communication line includes an inner and outer conductors and an insulator radially between the conductors, and showing that an outer sheath is sealed to a coupler;

FIG. 6 is closer view of the lower portion of the coupler of FIG. 3 showing that a busing assembly is received within a mount receiver to engage a connector with the conduction tip of the communication line.

DETAILED DESCRIPTION OF THE DRAWINGS

Figure 1A:
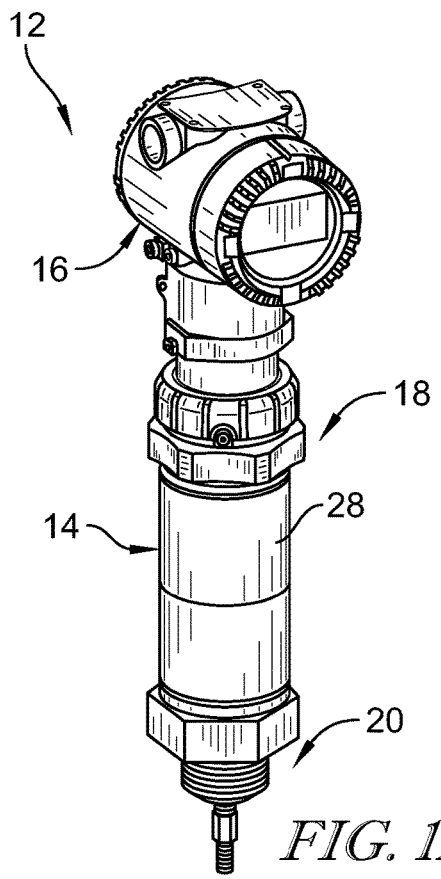
FIG. 1A is a perspective view of a sensor assembly for high and/or low energy systems showing that the assembly includes a coupler having an instrumentation head coupled to a receiver end and that the coupler has a mounting end for connection to high and low energy equipment such as a high (or low) temperature and/or high (or low) pressure tank.

While the concepts of the present disclosure are susceptible to various modifications and alternative forms, specific embodiments thereof have been shown by way of example in the drawings and will herein be described in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

Interaction with high (or low) energy systems, such as systems having high (or low) pressure and/or high (or low) temperature, can pose challenges. For example, high (or low) energy industrial processes can present challenges to safely and/or accurately interfacing with the system components in order to monitor the process. Moreover, interactions with high (or low) energy systems can affect the system itself, for example, presenting unsuitable risk of leakage to/from the systems. In monitoring high (or low) energy equipment and/or processes, sensor assemblies may penetrate into the equipment to ascertain information about the operations.

Figure 1B:
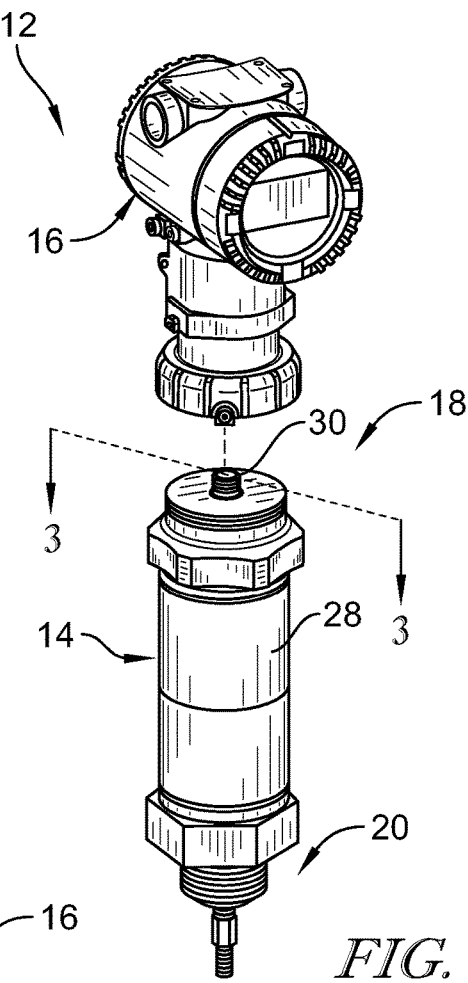
FIG. 1B is a perspective view of the sensor assembly of FIG. 1 showing the instrumentation head separated from the coupler and showing that the coupler has a body defining the receiving and mounting ends and including a communication port at the receiving end for receiving communication connection with the instrumentation head.

In the illustrative embodiment shown in FIGS. 1A and 1B, a sensor assembly 12 for interaction with high (and/or low) energy systems includes a coupler 14 receiving connection with an instrumentation head 16. The instrumentation head 16 is selectively connected with the coupler 14 by mounting to a receiving end 18 of the coupler 14. In the illustrative embodiment, radio frequency (RF) signals are transmitted between the instrumentation head 16 and the coupler 14 via this connection at the receiving end 18. Alternatively, in other embodiments, the instrumentation head 16 and the coupler 14 may be coupled via a coaxial cable to transmit RF signals between the instrumentation head 16 and the coupler 14.

Opposite the receiving end 18, the coupler 14 includes a mounting end 20 for connection to high (or low) energy equipment. The coupler 14 is adapted for mounting to equipment of a high (or low) energy system to transmit information of the high (or low) energy system, such as process variables, to the instrumentation head 16 for monitoring. One example of such information is a level measurement of the contents of a tank. In the illustrative embodiments of FIGS. 1A and 1B, the sensor assembly 12 is embodied as a guided wave radar (GWR) level transmitter, although in some embodiments, other types of instrumentation heads may be connectible with the coupler 14 to assess process conditions. In some embodiments, the instrumentation head 16 may be arranged to communicate an indication of measurement information to external users (not shown), for example, via another interface such as Highway Addressable Remote Transducer (HART) configured interface, Foundation Fieldbus, PROFIBUS, Modbus, and/or other suitable types of interfaces.

Figure 2:
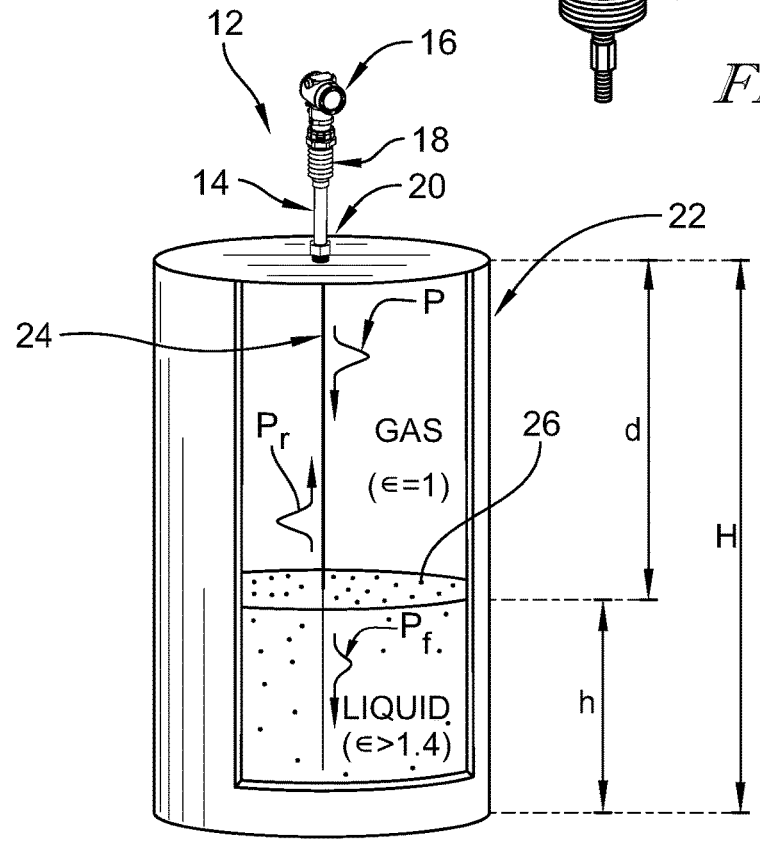
FIG. 2 is a perspective view of an illustrative embodiment of the sensor assembly of FIGS. 1A & 1B mounted a high energy tank showing that the sensor assembly is in communication with a waveguide probe extending through the tank to allow the sensor assembly to detect a level of liquid (or other media) within the tank by short pulses communicated along the waveguide probe causing a reflection of energy back to the sensor assembly from the surface of the liquid (or other media)

Referring to FIG. 2, the sensor assembly 12 is shown connected to a high (or low) energy tank 22. As a GWR level transmitter, the sensor assembly 12 is adapted to determine a level of process liquid inside the tank 22, indicated as height h. GWR level transmitters can operate by applying the time-of-flight measurement principle using, for example, time domain reflectivity (TDR). For example, the sensor assembly 12 can transmit RF pulses (p) through a probe 24 which extends inside the tank 22 into the liquid. The surface 26 of the liquid reflects a portion of the pulse energy ($p_r$) back through the probe 24 returning to the sensor assembly 12 while a fraction of the pulse energy ($p_f$) can pass through into the liquid, depending on its dielectric constant. In some applications (e.g., interface measurement), more than one layer may be present and may reflect more than one echo back signal. In some embodiments, the RF signals may be modulated, such as, for example, in Frequency-Modulated Continuous Wave (FMCW) arrangements.

The height h of the liquid can be determined according to the time elapsed ($\Delta t$) between the transmission of the pulse (p) and the receipt of the portion of the pulse energy ($p_r$), based on the speed of light c, where $$d = \frac{c \cdot \Delta t}{2}$$

and the liquid height h is typically equal to the tank height H less the gas height d, (h=H−d). The pulses (p) are illustratively embodied as short, sub-nanosecond (sub-ns) electromagnetic signal pulses. The equivalent time sampling (ETS) principle allows capture and reconstruction of sub-ns signals into lower frequencies to permit easier digitization with low cost analog-to-digital converters. Although described as a liquid for descriptive purposes, in some embodiments, the media being sensed may take any state and/or form of matter (e.g., a solid) capable of reflecting a portion of pulse energy to the sensor assembly 12 for determining the height h of the surface 26. In some embodiments, the sensor assembly 12 may be configured to determine the height h as an interface between two different types and/or states of media, for example, where the height h is at the interface height between a layer of oil on the top of a layer of water, known as interface measurement.

Figure 3:
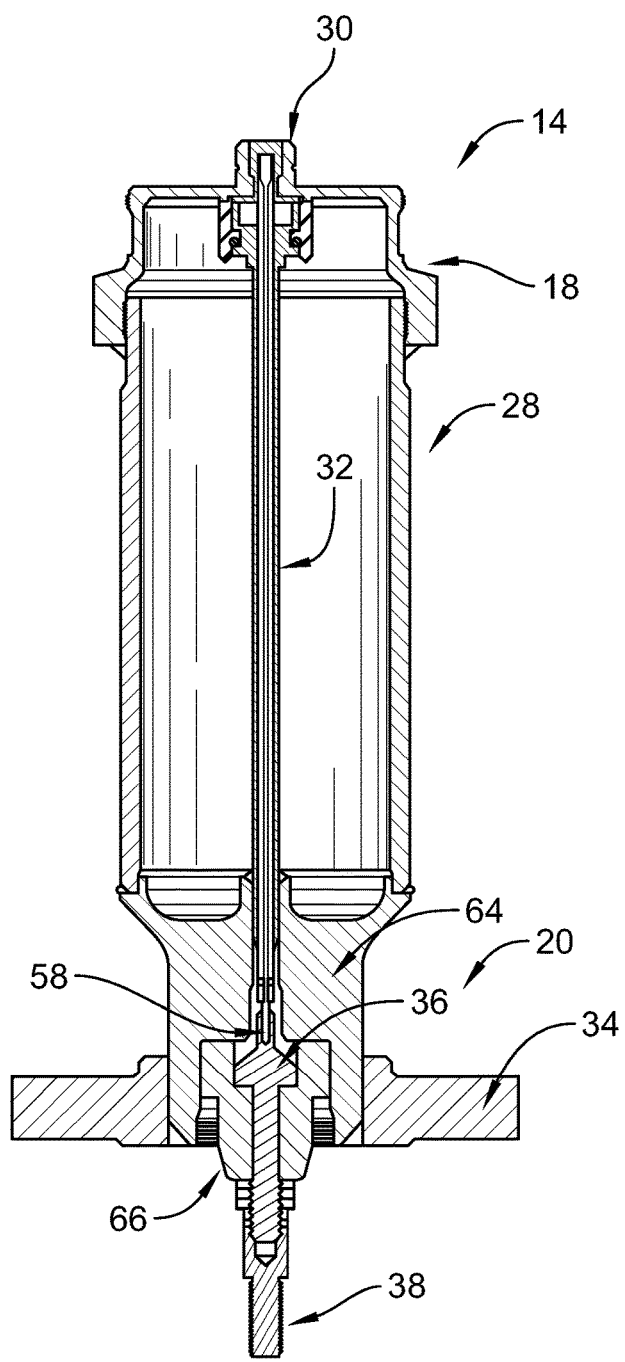
FIG. 3 is cross-section view of the coupler of the sensor assembly of FIGS. 1A & 1B taken along the line 3-3 in FIG. 1B showing that the coupler includes a communication line extending from the communication port through the coupler for communicating pulse signals with high and/or low energy systems.

Referring to FIG. 3, a cross-section of the coupler 14 is shown to illustrate interior areas. The coupler 14 includes a body 28 defining the receiving and mounting ends 18, 20. At the receiving end 18 the body 28 includes an instrumentation portal 30 for connection with the instrumentation head 16 to communicate RF signals. A communication line 32 extends between the instrumentation portal 30 and the mounting end 20 to communicate RF signals. The body 28 is shown including a flange 34 for mechanical mounting onto the tank 22, although the coupler 14 may be secured to the tank 22 by any suitable means, such as, for example, a threaded connection. The communication line 32 engages with a connector rod 36 near the mounting end 20 of the body 28 that includes a connector end 38 protruding from the body 28 for communicating RF signals to and from the interior of the tank 22.

Figure 4:
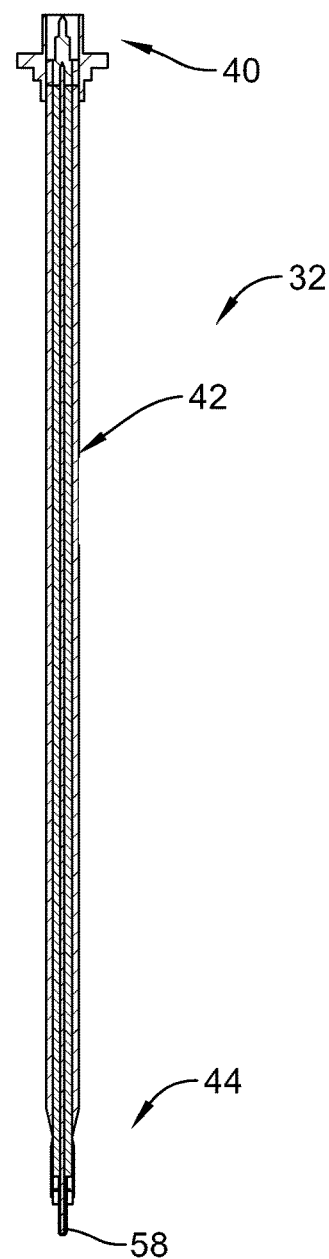
FIG. 4 is a cross-sectional view of the communication line of the sensor assembly of FIGS. 1-3 in isolation showing that the communication line is a coaxial hardline cable having a conduction tip for connection to the process probe.

As shown in FIG. 4, the communication line 32 includes a line head 40 for connection with the instrumentation head 16 at the instrumentation portal 30. A length 42 of the communication line 32 extends between the line head 40 and a conduction tip 44. The conduction tip 44 is arranged near the mounting end 20 of the body 28 for engagement with the connector rod 36. The communication line 32 is illustratively formed as a rigid (or semi-rigid) hardline coaxial cable having a stable and constant impedance of about 50 Ohms, suitable for reliable transmission of frequencies up to several GHz (it is contemplated that, in other embodiments, the cable having another impedance, such as, for example, about 75 Ohms). Communication line 32 is embodied as a mineral insulated signal transmission cable (MISTC) for transmitting RF signals between the instrumentation head 16 and the high (or low) energy equipment (i.e., tank 22). In other embodiments, the line head 40 may be replaced with an RF connector on a flexible coax spliced with the length 42 of the communication line 32.

As best shown in FIG. 5, the communication line 32 as a coaxial line includes an inner conductor 46 embodied as a central line, an outer conductor 48 embodied as a hollow sheath disposed about the inner conductor 46, and an insulator 50 embodied as a hollow sheath disposed radially between the inner and outer conductors 46, 48. The inner conductor 46 is embodied to be formed of copper and the outer conductor 48 is embodied to be formed of copper, although in some embodiments, either conductor may include any suitable conductive material. The communication line 32 illustratively includes a hollow outer sheath 52 encasing the inner and outer conductors 46, 48 approaching the conduction tip 44. The outer sheath 52 is illustratively formed of stainless steel 316L, but in some embodiments, may include any suitable materials, including but without limitation, stainless steels 316, 304, 304L, Inconel alloy and/or other alloys.

The conduction tip 44 of the communication line 32 is adapted to connect with the connector rod 36. An end portion 56 of the communication line 32 is fitted into the hollow coupler sleeve 54 of the conduction tip 44. A seal 55 is formed between the coupler sleeve 54 and the outer sheath 52 at the overlapping end to block against leakage. The seal 55 is illustratively embodied as a brazed seam that extends about the circumference of the sleeve 54, although in some embodiments, the seal 55 may include any suitable manner of sealing connection, such as, for example, a welding seam. At the end portion 56 of the outer sheath 52, the outer conductor 48 and insulator 50 illustratively terminate, while the inner conductor 46 extends outward (downward in FIG. 5).

As shown in FIG. 5, the inner conductor 46 extends from within the outer conductor 48 and the insulator 50 at the end portion 56 to a free end 58. The inner conductor 46 includes a covering 60 surrounding the inner conductor 46 along the portion which extends out from the outer conductor 48 and insulator 50. The covering 60 is illustratively formed of a nickel alloy for conduction, although in some embodiments, the covering 60 may include any suitable conduction material.

A termination plug 62 is arranged within the coupler sleeve 54 at the end portion 56. The termination plug 62 is illustratively embodied as a ceramic insulation material. The termination plug 62 is illustratively sealed at a seam 63 with the coupler sleeve 54, and at a seam 65 with the covering 60, to block against leakage via the conduction tip 44. The seams 63, 65 are embodied as brazed seams, but in some embodiments, may include any suitable manner of seal (e.g., welding). The termination plug 62 receives the inner conductor 46 and covering 60 extending therethrough to the free end 58 for connection with the connector rod 36.

Referring now to FIG. 6, the body 28 of the coupler 14 includes a mount receiver 64 for receiving a bushing assembly 66. The mount receiver 64 includes a receptacle 68 defined therein for receiving the bushing assembly 66. The bushing assembly 66 is mounted into the receptacle 68 to engage the connector rod 36 with the communication line 32.

The bushing assembly 66 is illustratively formed to fill the receptacle 68 to reduce empty space which can cause impedance variations that negatively affect measurements (e.g., impedance mismatch, reflections, noise, false echoes). The bushing assembly 66 illustratively includes a ceramic bushing 70 having a cavity 72 defined therein for receiving the connector rod 36. The bushing 70 receives and engages the connector rod 36 to maintain engagement of the connector tip 37 with the conduction tip 44 of the communication line 32.

The bushing assembly 66 illustratively includes a fastener nut 74 and Belleville retainer 76 for fastening the bushing 70 into place within the receptacle 68. The fastener nut 74 illustratively includes external threads engaging with corresponding internal threads defined on a side wall 78 of the mount receiver 64 that defines a portion of the receptacle 68. In the illustrative embodiment, the side wall 78 includes exterior threads 80 for threaded connection with the tank 22. The bushing 70 is fastened into position to engage the connector rod 36 with the conduction tip 44 by threading the fastener nut 74 into the receptacle 68.

As previously mentioned, the bushing 70 engages the connector rod 36 by reception of a head 82 of the connector rod 36 with the cavity 72. The cavity 72 is partly defined by an endwall 84 of the bushing 70 which urges a bottom side 86 of the head 82 to support the connector rod 36 to maintain connection with the conduction tip 44. A gasket 88 is arranged between the endwall 84 and a (bottom) side 86 of the head 82 to seal against leakage from the equipment. The gasket 88 is illustratively embodied as a flat, annular member formed of graphite and receiving a stem 90 of the connector rod 36 therethrough.

Referring still to FIG. 6, the receptacle 68 of the mount receiver 64 is defined partly by an endwall 92. The endwall 92 includes an opening 93 therein which connects with a passageway 94 of the mount receiver 64 through which the communication line 32 extends. A gasket 96 is arranged between the endwall 92 and an endface 98 of the bushing 70. The gasket 96 is illustratively embodied as a flat, annular member formed of graphite and receiving a portion of the connector rod 36 therethrough. Together the gaskets 88, 96 form a sealing section disposed between the conduction tip 44 and the mounting end 20 to block against leakage to/from the tank 22. The connector rod 36 extends through the sealing section for engagement with the conduction tip 44.

The connector tip 37 includes an arm 100 extending through the opening 93 for connection with the conduction tip 44. The arm 100 illustratively forms a female connection for receiving the free end 58 of the inner conductor 46 as a male connection therein. The communication line 32 terminates within the passageway 94, and connection between the connector tip 37 and the free end 58 is disposed within the passageway 94. Accordingly, the communication line 32 does not extend through the endwall 92.

As previously mentioned, the communication line 32 extends through the passageway 94. The passageway 94 is illustratively defined through a base portion 104 of the body 28 from which the mount receiver 64 extends. The base portion 104 is formed as a solid portion of the body 28 providing structural integrity for the body 28 near the mounting end 20. A seal 106 is formed between the communication line 32 and the base portion 104. The seal 106 is embodied as a brazing seam extending about the circumference of the communication line 32, but in some embodiments, may include any suitable manner of seal (e.g., welding). The seal 106 together with the seal 55 forms another seal section for blocking against leakage from the tank 22. Although the seals 55, 106 are illustratively embodied as brazing seams, in some embodiments, the seals 55, 106 may include any suitable sealing joint configuration, such as welding seams.

The seal section formed by the gaskets 88, 96 and the seal section formed by the seals 55, 106 provide multiple layers of blockage against leakage of high (or low) energy systems. Under failure of one of the seal sections, for example, the primary seal section (of gaskets 88, 96), leakage from the high (or low) energy systems (e.g., tank 22) may migrate between the first and the second seal. This leakage will change the signal reflection inside the coupler 14 and can be detected by the analysis of the signal at the instrumentation head 16. The secondary seal section (of seals 55, 106) can mitigate leakage beyond the body 28, while the detection of primary seal section failure can be recognized and addressed according its detection based on the change in signal reflection.

In some embodiments, the seal section of gaskets 88, 96 may be excluded in favor of a single seal section provided by seals 55, 106. In such embodiments, the bushing assembly 66 fills the receptacle 68 entirely to avoid empty space. When the seal section of seals 55, 106 is intact (i.e., unbroken), migration of media (or other substance(s)) from the tank 22 into the coupler (e.g., from the bottom of the coupler), which can affect communication signals through the communication line 32, can be avoided. If the seal section of seals 55, 106 does fail, in such embodiments, a migration of media (or other substance(s)) from the tank 22 into the coupler 14 is possible. If migrating media reaches the communication line 32, it will alter signals transmitted by the communication line 32, and this alteration can be detected to determine that the seal section of seals 55, 106 has failed.

Figure 7:
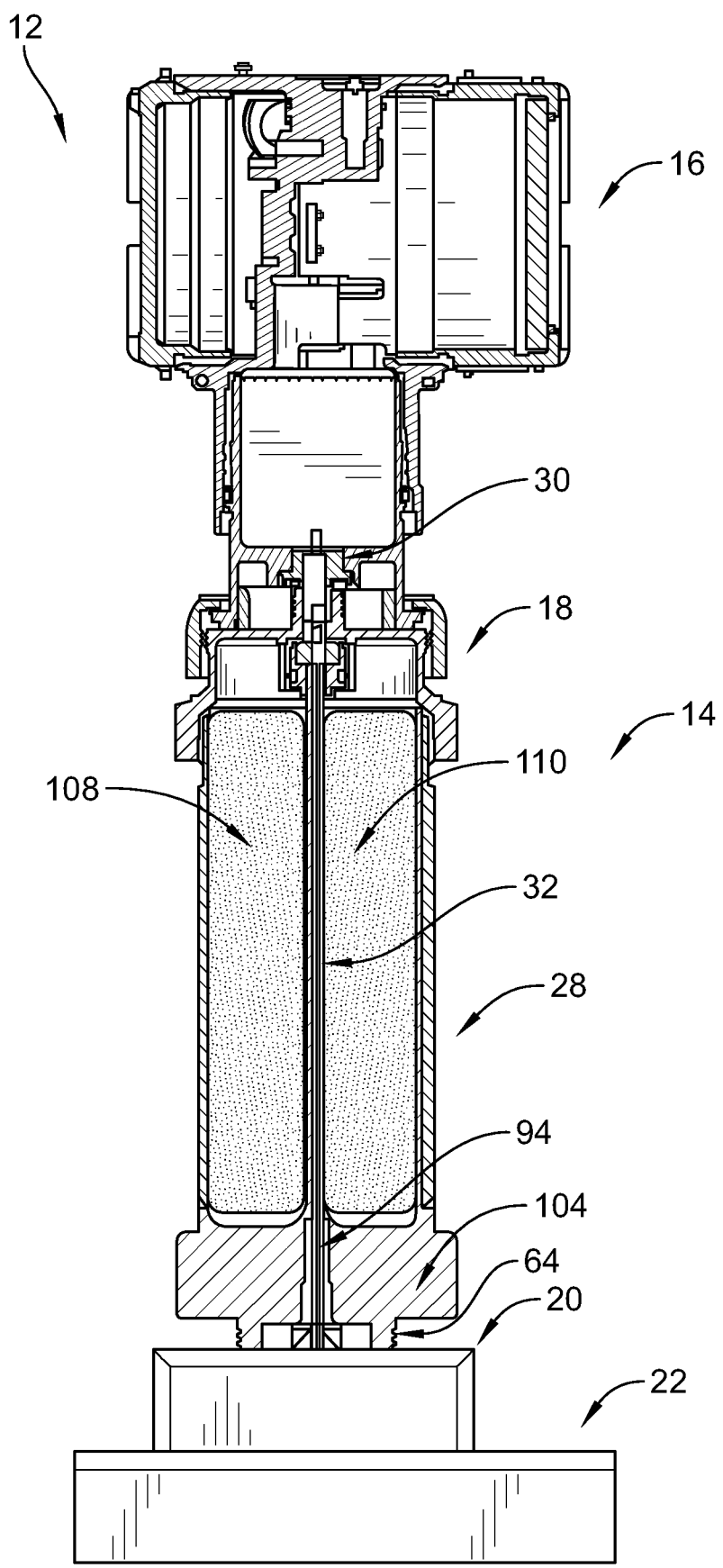
FIG. 7 is a cross-sectional view of the sensor assembly, similar to the view of FIG. 3, showing that the body of the coupler is filled with a unitary insulator to discourage heat transfer.

As shown in FIG. 7, a cross-section of the sensor assembly 12 is shown. The body 28 of the coupler 14 illustratively defines a cavity 108 therein between the receiving and mounting ends 18, 20. The communication line 32 extends through the cavity 108 between the instrumentation portal 30 and the conduction tip 44. The cavity 108 is illustratively filled with an insulation material 110 that surrounds the communication line 32 to resist heat transfer. Applying a singular insulation body by filled insulation can avoid impedance mismatch and/or undesired reflections.

The present disclosure includes systems, devices, and methods for high/low temperature and/or high/low pressure process seals for instrumentation devices such as guided wave radar level transmitters. Guided Wave Radar (GWR) level transmitters are often used for very high/low temperature and high/low pressure applications (HTHP). Electronic circuit sends sub-ns electrical pulses transmitted through a process connection along a waveguide probe at the speed of light. When pulses reach a dielectric discontinuity, part of the energy is reflected back to the transmitter and captured at a receiver which calculates the transit time and the corresponding height of media in a vessel (see FIG. 2). One example of temperatures and pressures that can be realized inside the tank may include 450° C. (842° F.) and 430 bar (6527 psi), although higher and/or lower temperatures and/or pressures can be applied, and the HTHP coupler, as a process interface, needs to protect external world while transmitting the RF signal effectively between the electronic circuit and the waveguide inside the tank.

Within the present disclosure, a hardline mineral insulated coaxial cable may be applied to allow operation at very high/low temperature and/or pressure while transmitting with a better efficiency the RF signal in the tank. Challenges may arise in accurately and reliably measuring tank level for HTHP applications. The coupler of the GWR, typically mounted on a tank using a threaded fitting or a flange fitting, should separate the HTHP process side (where the measurement of the physical quantity is required) from the control side (where electronic circuit controls the device). Couplers within the present disclosure integrate a tight and robust seal to block against leakage between the process side and the control side and to prevent the migration of process fluids from the tank into the wiring system (or alternatively leakage into the system from the environment, for example in low pressure systems). In some embodiments, second seal (dual seal) may be applied to increase the security of the measuring system. The arrangements may provide an indication of a primary seal failure.

Couplers within the present disclosure may include an RF transmission line allowing the RF pulse to be transmitted from the electronic circuit through the coupler which can be connected with the waveguide probe inside the tank in contact with the media to be measured. The control of the impedance (typically 50 Ohms) from the RF electronic circuit to the end of the coupler can promote desirable operation. Variation of the impedance and/or impedance mismatch can generate reflections, adding noise and/or false echoes into the echo back signal, which can cause errors in the level measurement.

The present disclosure includes potential improvements to the performance and reliability of a GWR level transmitter for HTHP applications. The HTHP coupler can be connected to a sensor head by a robust RF connector, type N for instance. A remote coaxial cable can also be used to connect the coupler to a remote sensor head. The HTHP coupler can include a Mineral Insulated Signal Transmission Cable (MISTC) to transmit the RF signal from the top of the coupler to the interconnection with the waveguide inside the tank. The MISTC has a high insulated resistance using an insulator, for example, $SiO_2$. The cable can be formed resistant to extreme temperatures and pressures such as temperatures within the range of about −273 to about 600° C. (about −460 to about 1112° F.). Thus, although descriptions within the present disclosure may refer to high energy (e.g., high temperature and/or pressure), the arrangements of the present disclosure can apply equally to low energy systems (e.g., low temperature and/or pressure).

The tip of the cable can be formed with metal and brazed ceramic welded on the outer shield of the cable. The tip may form part of the second seal of the coupler. The tip can be coupled to a small rod inserted within the waveguide probe which is in contact with the media inside the tank. The small rod can be surrounded by an insulated material, typically ceramic for HTHP applications, which is inside an outer conductor. The length of this section can be formed small enough to avoid high reflections even if the impedance is not perfectly at 50 Ohms. Graphite gasket(s) may be applied in the primary seal. If this primary seal is broken, part of the gas/steam under pressure of the tank may migrate between the first and the second seal. The signal reflection inside the coupler will change and can be detected by the analysis of the signal.

The MISTC can be integrated into a section of the coupler body enclosure which provides an efficient thermal barrier between the process side and the electronic sensor head. This section can be filled with insulation material to increase the efficiency. This MISTC can be formed of one inner conductor, typically copper, and two sheaths: an inner sheath (outer conductor) which is typically copper and outer sheath which is typically stainless steel (304, 3016, 3016L) or other alloys as INCONEL. An insulator material (such as MgO, $Al_2O_3$, and $SiO_2$) may be arranged between the inner conductor and inner sheath (outer conductor) and can provide a high insulation resistance and a constant impedance along the cable even in the case of large variation of temperature.

The coupler can be simple to manufacture by using a MISTC. The MISTC outer sheath can be brazed onto the core body of the coupler and, paired with the tip, can be made with metal and brazed ceramic and having very small diameter which can encourage reliability for HTHP applications. The tip can allow a simple connection to a small rod in contact with the waveguide probe. This configuration can allow incorporation of another seal at the bottom of the core of the coupler (closer to the connection with the high energy system equipment). This short section can use an insulated material, typically ceramic, inside an outer conductor that is typically tapered at the end without a hollow (space) at the end of the coupler. The combination of MISTC and this short section without hollow (space) can assist in avoiding multiple reflections. This can improve measurement close to the top of the tank (i.e., decrease dead zone).

Arrangements within the present disclosure can allow smaller HTHP couplers that can be easier to produce by decreasing the number of components for very high temperature and pressure applications. Arrangements within the present disclosure can reduce internal reflections allowing improved signal transmission, decreasing the noise in the echo back signal, reducing the dead zone and/or allowing the detection of a first seal broken. In some embodiments, components can be installed from the bottom of the coupler which can assist in avoiding hollow spaces at the end of the threaded section which can allow better impedance control.

While certain illustrative embodiments have been described in detail in the figures and the foregoing description, such an illustration and description is to be considered as exemplary and not restrictive in character, it being understood that only illustrative embodiments have been shown and described and that all changes and modifications that come within the spirit of the disclosure are desired to be protected. There are a plurality of advantages of the present disclosure arising from the various features of the methods, systems, and articles described herein. It will be noted that alternative embodiments of the methods, systems, and articles of the present disclosure may not include all of the features described yet still benefit from at least some of the advantages of such features. Those of ordinary skill in the art may readily devise their own implementations of the methods, systems, and articles that incorporate one or more of the features of the present disclosure.

The invention claimed is:

1. A sensor assembly for level measurement of high and/or low energy systems, the sensor assembly comprising:
an instrumentation head to determine a level of media in a tank;
a coupler including a body having a mounting end for connection to equipment of a high or low energy system and a receiving end for receiving connection of the instrumentation head, a coaxial hardline extending between the mounting end and the receiving end and including a conduction tip arranged near the mounting end, wherein the body includes a mount receiver at the mounting end formed to receive a bushing assembly to engage a connector with the conduction tip; and
a sealing system including a first seal section disposed between the conduction tip and the receiving end of the body.

2. The sensor assembly of claim 1, wherein the first seal section includes a fused seam between a sleeve of the coaxial hardline and the body of the coupler.

3. The sensor assembly of claim 1, wherein the first seal section includes a fused seam between a sleeve of the coaxial hardline and an extension tube of the conduction tip.

4. The sensor assembly of claim 1, wherein a gasket is disposed between the bushing assembly and the body and forms at least a portion of a second seal section of the sealing system.

5. The sensor assembly of claim 4, wherein another gasket is disposed between the bushing assembly and the connector and forms at least another portion of the second seal section.

6. The sensor assembly of claim 1, wherein the mount receiver defines a receptacle for receiving at least a portion of the bushing assembly and the receptacle includes interior threads for receiving a fastener of the bushing assembly.

7. The sensor assembly of claim 6, wherein the connector penetrates through the bushing assembly and the bushing assembly fills the receptacle to reduce empty space at the mounting end.

8. The sensor assembly of claim 7, wherein the coaxial hardline includes an inner conductor, an outer conductor, and an insulator between the inner conductor and the outer conductor.

9. The sensor assembly of claim 8, wherein the insulator comprises at least one of MgO, $Al_2O_3$, and $SiO_2$.

10. The sensor assembly of claim 6, wherein the bushing assembly includes a ceramic bushing defining a cavity therein for receiving a head of the connector.

11. The sensor assembly of claim 10, wherein a gasket forming at least a portion of a second seal section of the sealing system is disposed between the head and the bushing, the head positioned between the gasket and the conduction tip.

12. The sensor assembly of claim 6, wherein the mount receiver includes an endwall surface defining a base of the receptacle having an opening communicating with a passageway containing the coaxial hardline, wherein the conduction tip terminates within the passageway.

13. The sensor assembly of claim 12, wherein the coaxial hardline does not extend through the endwall surface.

14. The sensor assembly of claim 1, wherein the mount receiver is formed as an extension from a base portion of the body, the base portion having a solid core for providing structural support to the sensor assembly, the solid core having a through passageway into which the coaxial hardline extends, wherein the first seal section includes a fused seam formed between the mount receiver and a sleeve of the coaxial hardline to seal the passageway against leakage.

15. The sensor assembly of claim 1, wherein the body defines a cavity through which the coaxial hardline extends, wherein the cavity is filled with an insulation material.

16. The sensor assembly of claim 1, wherein the coaxial hardline is a 50 ohm impedance hardline.

17. The sensor assembly of claim 7, wherein the connector engages the conduction tip when the bushing assembly is installed from the mounting end of the coupler.

18. The sensor assembly of claim 1, wherein the sealing system includes a second seal section disposed between the conduction tip and the mounting end of the body of the coupler.

19. The sensor assembly of claim 18, wherein the second seal section includes at least one gasket.

* * * * *